United States Patent [19]

Lie

[11] Patent Number: 4,697,553

[45] Date of Patent: Oct. 6, 1987

[54] LUBRICATING OIL INPUT SYSTEM

[76] Inventor: Zong Z. Lie, No.18-1, Kuang Ming Road, West Twen District, Taichung City, Taiwan

[21] Appl. No.: 895,276

[22] Filed: Aug. 11, 1986

[51] Int. Cl.[4] ............................................. F02B 33/04
[52] U.S. Cl. ........................... 123/73 AD; 123/196 R
[58] Field of Search ...................... 123/73 AD, 196 R

[56] References Cited

U.S. PATENT DOCUMENTS

| 4,388,896 | 6/1983 | Sheridan et al. | 123/73 AD |
| 4,594,970 | 6/1986 | Baars et al. | 123/73 AD |
| 4,596,277 | 6/1986 | Djordjevic | 123/73 AD |

*Primary Examiner*—E. Rollins Cross
*Attorney, Agent, or Firm*—Gifford, Groh, VanOphem, Sheridan, Sprinkle and Dolgorukov

[57] ABSTRACT

A lubricating oil input system includes a joiner, a first ignition advance vacuum tube connected between the joiner and distributor of an internal combustion engine, a second ignition advance vacuum tube connected between the joiner and carburetor of the engine, a connecting tube connected between the joiner and an oil tank which contains lubricating oil and cleaner. The system further includes a small tube disposed within the connecting tube, joiner and second ignition advance vacuum tube; a filter means disposed at the joint region of the oil tank and connecting tube; and a returning means connected to the first ignition advance vacuum tube abutting against the joiner, so that the lubricating oil is directed from the oil tank through the lubricating oil input system into the carburetor to be mixed with gasoline.

1 Claim, 5 Drawing Figures

FIG_4

4,697,553

LUBRICATING OIL INPUT SYSTEM

BACKGROUND OF THE INVENTION

Gasoline must be mixed with lubricating oil and then be sent into the cylinder of engine to be burned. In the prior art, lubricating oil was added into the gasoline tank directly and automatically mixed with gasoline. The mixed oil-and-gasoline was sent into the engine to be burned. However, adjusting the mixing rate of oil and gasoline was not very convenient. Thus, when the gasoline was added, the lubricating oil had to be added simultaneously. This was not a convenient operation either.

Therefore, it is the purpose of the present invention to mitigate and/or obviate the abovementioned problems in the manner set forth in the detailed description of the preferred embodiment.

SUMMARY

A primary objective of this invention is to provide a lubricating oil input system which can input lubricating oil into the engine and easily control the mixing rate of the oil and gasoline.

Another objective of this invention is to provide a lubricating oil input system which comprises a returning means to receive any back flow of lubricating oil.

Further objectives and advantages of the present invention will become apparent as the following description proceeds, and the feature of novelty which characterizes the invention will be pointed out with particularity in the claims annexed to and forming a part of this invention.

DETAILED DESCRIPTION OF THE PREFERRED EMBODIMENT

Figure 1:
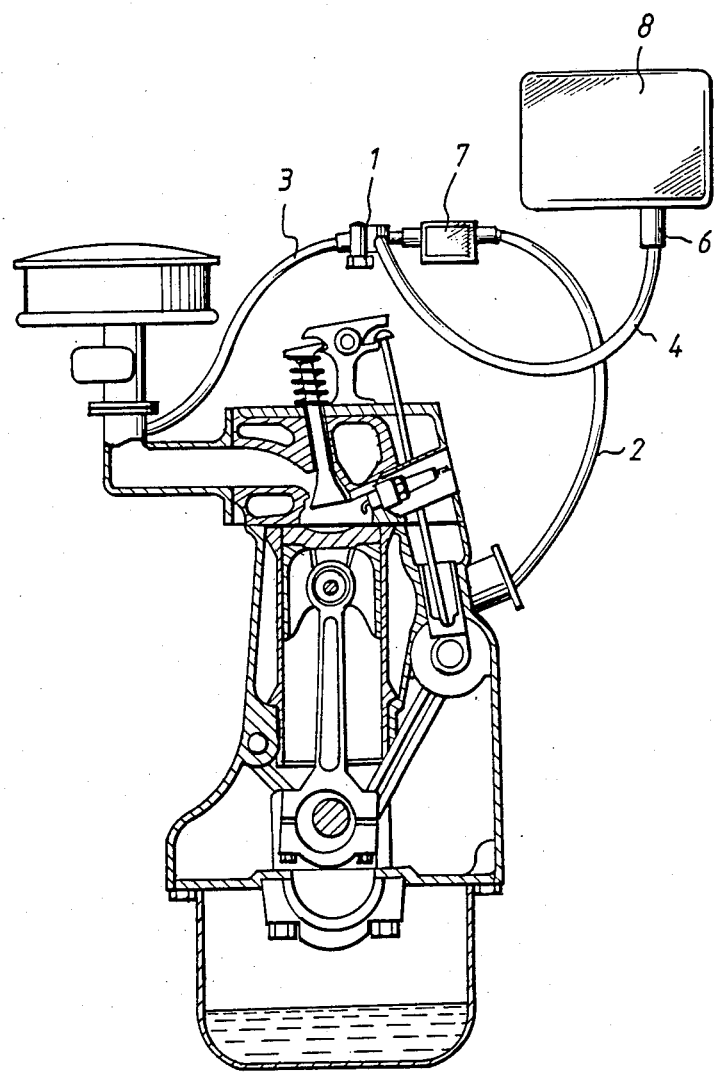
FIG. 1 shows the lubricating oil input system of the present invention attached to an internal combustion engine, wherein the piston is at the top position.
Figure 2:
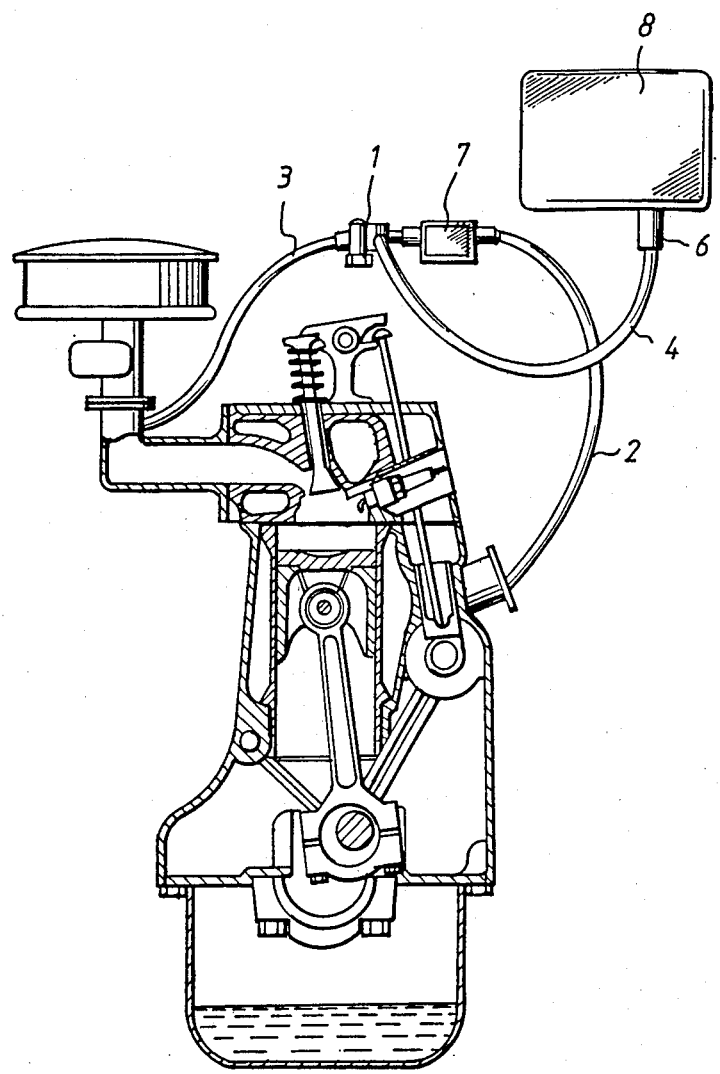
FIG. 2 shows the lubricating oil input system of the present invention attached to an engine, wherein the piston is at the bottom position.
Figure 3:
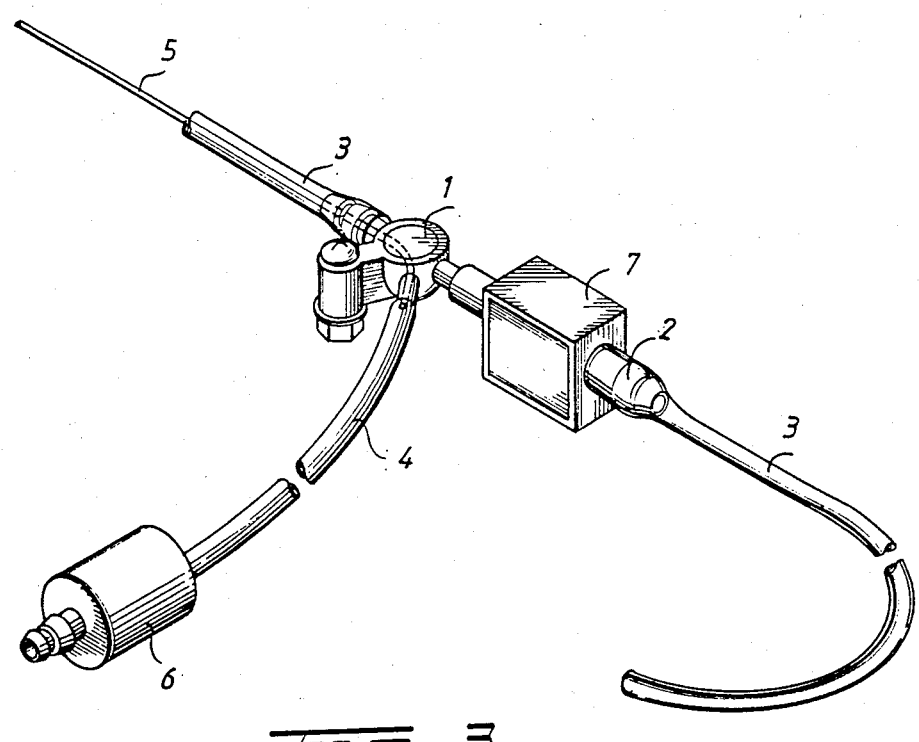
FIG. 3 is perspective view of the lubricating oil input system of the present invention.
Figure 4:
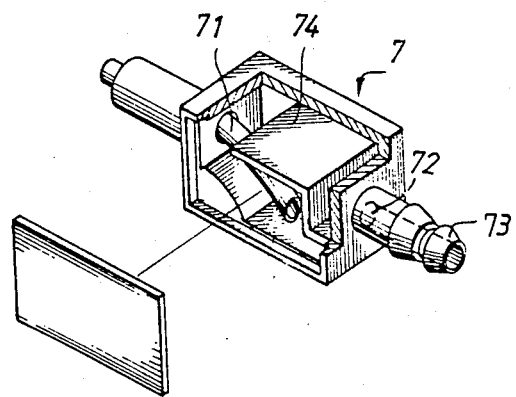
FIG. 4 is a cutaway view showing the interior of the returning means of the present invention.
Figure 5:
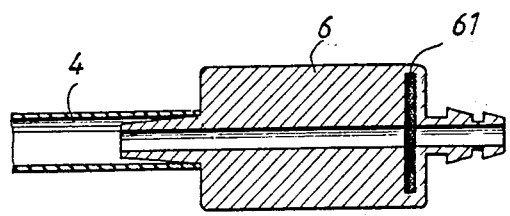
FIG. 5 is a cross-sectional view of the filter means of the present invention.

Referring to the drawings, the lubricating oil input system comprises a joiner (1), a first ignition advance vacuum tube (3), a second ignition advance vacuum tube (2), a connecting tube (4), a small tube (5), a filter means (6), a returning means (7) and an oil tank (8). As can be seen in FIG. 1 and FIG. 3, the joiner (1) is arranged with a fixing seat to be fixed to vehicle (not shown). The second ignition advance vacuum tube (2) is connected between the joiner (1) and the carburetor of the engine (the carburetor is not shown in the drawings). The first ignition advance vacuum tube (3) is connected between the joiner (1) and the distributor of the engine (the distributor is not shown in the drawings). The connecting tube (4) is connected between the joiner (1) and the oil tank (8) which contains lubricating oil. A small tube (5) is disposed in the connecting tube (4), the joiner (1) and the second ignition advance vacuum tube (2). There is a filter means (6) (referring to FIG. 5) disposed at the base of the oil tank (8) which on the other end joins with the connecting tube (4). A filter medium (61) is disposed at the output side of the filter means (6) to filter the lubricating oil. The returning means (7) is disposed on the first ignition advance vacuum tube (3) and abuts against the joiner (1). Referring to FIG. 4, it can be seen that a separating plate (74) separates the returning means (7) into two spaces. As shown in FIG. 4, the left space of the returning means (7) has a returning tube (71) which is connected to joiner (1). An aperture (72) is drilled on the right side wall of the housing of the returning means (7). A one-way valve (73) is fixed proximate to the aperture (72) and projects out from the returning means housing (7) to be connected to the first ignition advance vacuum tube (3).

The oil tank (8) may contain lubricating oil and cleaners (optional). When the driver presses the accelerator (i.e adds more gasoline into engine), the lubricating oil (with or without cleaner) will simultaneously be directed into the engine. Even if the gasoline in the gasoline tank runs low and the driver has to fill has gas tank, it is not necessary to simultaneously fill lubricating oil. This is because the lubricating oil mixes with the gasoline at a slow rate, so that once the driver fills the oil tank (8) with oil, the oil will not have to be refilled for a long period of time. In addition, a control means can be arranged with the carburetor and used to control the rate of oil addition. This design can be easily made by a general technician.

As can be seen in the above description, as long as the driver presses the accelerator, oil flows from the oil tank (8) through filter means (6), and eventually to the carburetor, where it mixes with gasoline and air to be sent into engine. However, when the driver presses the brake, the flow of oil may be reversed, in which the returning means (7) would receive the back flow of oil.

As various possible embodiments might be made of the above invention without departing from the scope of the invention, it is to be understood that all matter herein described or shown in the accompany drawing is to be interpreted as illustrative and not in a limiting sense. Thus, it will be appreciated that the drawings are exemplary of a preferred embodiment of the invention.

I claim:

1. A lubricating oil input system which is connected to an internal combustion engine comprising:
    a joiner having a fixing seat to be fixed to the vehicle body;
    a first ignition advance vacuum tube connected between said joiner and the distributor of said internal combustion engine;
    a second ignition advance vacuum tube connected between said joiner and the carburetor of said internal combustion engine;
    a connecting tube connected between said joiner and an oil tank which is used for containing lubricating oil and optionally containing an added cleaner;
    a small tube which is disposed in said connecting tube, said joiner, and said second ignition advance vacuum tube;
    a filter means which is disposed at the joint region of said oil tank and said connecting tube, said filter means comprising a filter medium to filter the lubricating oil which flows from the oil tank;
    a returning means which is disposed on said first ignition advance vacuum tube abutting against the joiner, said returning means comprising a separating plate to separate the returning means into two spaces, the left space having a returning tube connected to said joiner and the right space having an aperture on the right side wall thereof; a one-way valve being fixed proximate to said aperture which protrudes from one end of the returning means housing so as to connect to said first ignition advance vacuum tube.

* * * * *